(12) United States Patent
Gutowitz

(10) Patent No.: US 6,219,731 B1
(45) Date of Patent: Apr. 17, 2001

(54) METHOD AND APPARATUS FOR IMPROVED MULTI-TAP TEXT INPUT

(75) Inventor: Howard Gutowitz, New York, NY (US)

(73) Assignee: Eaton: Ergonomics, Inc., New York, NY (US)

(*) Notice: Subject to any disclaimer, the term of this patent is extended or adjusted under 35 U.S.C. 154(b) by 0 days.

(21) Appl. No.: 09/347,188

(22) Filed: Jul. 3, 1999

Related U.S. Application Data

(60) Provisional application No. 60/111,665, filed on Dec. 10, 1998.

(51) Int. Cl.[7] ............................. G06F 13/38; G06F 13/12
(52) U.S. Cl. ............................................. 710/67; 707/102
(58) Field of Search .................................... 707/102, 104, 707/5, 6, 1, 7; 379/356; 710/67

(56) References Cited

U.S. PATENT DOCUMENTS

| | | | |
|---|---|---|---|
| 3,929,216 | * 12/1975 | Einbinder | ............................. 197/100 |
| 4,042,777 | 8/1977 | Bequaert et al. . | |
| 4,058,795 | 11/1977 | Balm . | |
| 4,650,349 | * 3/1987 | Westreich | ............................. 4/927.2 |
| 4,680,728 | 7/1987 | Davis, II et al. . | |
| 4,737,980 | 4/1988 | Curtin et al. . | |
| 4,891,777 | * 1/1990 | Lapeyre | ............................. 708/130 |
| 5,031,206 | 7/1991 | Riskin . | |
| 5,121,472 | * 6/1992 | Danish et al. | ......................... 710/67 |
| 5,128,672 | * 7/1992 | Kaehler | ................................ 341/23 |
| 5,339,358 | 8/1994 | Danish et al. . | |
| 5,392,338 | 2/1995 | Danish et al. . | |
| 5,548,634 | 8/1996 | Gahang et al. . | |

(List continued on next page.)

FOREIGN PATENT DOCUMENTS

WO 96/27947   9/1996   (WO) .

OTHER PUBLICATIONS

Shannon, C.E., "Prediction and Entropy of Printed English", Bell System Technical Journal, vol. 27, pp. 51–65, Jan. 1951.

Arnott, J.L. and Javed, M.Y., "Probalistic Character Disambiguation for Reduced Keyboards Using Small Text Samples, AAC Augmentative and Alternative Communication", vol. 8, Sep. 1992.

Foulds, R.A., Soede, M., and Van Balkom, H., "Statistical Disambiguation of Multi–Character Keys Applied to Reduce Motor Requirements for Augmentative and Alternative Communication" AAC Augmentative and Alternative Communication, 1987.

Kamphuis, H., and Soede, M., "Katdas: A Small Number of Keys Direct Access System", Resna 12$^{th}$ Annual Conference, Louisiana, 1989.

Primary Examiner—Thomas G. Black
Assistant Examiner—Uyen Le

(57) ABSTRACT

The defacto standard for text entry on standard telephone keypads, such as fixed phones, cell phones, fax machines, and the like is a multi-tap method where one of several letters associated to a input means is selected by pressing the input means a number of times equal to the position of the desired letter in the ordering of letters associated to the input means. Typically, for the standard alphabetic ordering, a large number of presses are required to obtain any given letter. The present invention uses prefix information to dynamically reorder the choices so that the average number of input means manipulations is reduced. This method is applicable to any language composed of strings of symbols for which the probability of any given symbol appearing in a string at a given position is correlated with the probability of another symbol appearing in the string. Using adapted data compression techniques, the amount of information which needs to be stored for excellent results on any given language can be kept small.

24 Claims, 11 Drawing Sheets

U.S. PATENT DOCUMENTS

| | | |
|---|---|---|
| 5,559,512 | 9/1996 | Jasinski et al. . |
| 5,661,476 * | 8/1997 | Wang et al. ............................ 341/22 |
| 5,748,177 * | 5/1998 | Baker et al. ......................... 345/133 |
| 5,797,098 | 8/1998 | Schroeder et al. . |
| 5,911,485 * | 6/1999 | Rossmann ............................... 34/22 |
| 5,917,905 * | 6/1999 | Whipple et al. ..................... 379/356 |
| 5,953,541 * | 9/1999 | King et al. ............................ 710/67 |
| 5,960,385 * | 9/1999 | Skiena et al. ............................ 704/9 |
| 5,982,351 * | 11/1999 | White et al. ......................... 345/146 |
| 5,990,890 * | 11/1999 | Etheredge ............................ 345/347 |
| 6,004,049 * | 12/1999 | Knox ..................................... 400/89 |
| 6,005,495 | 12/1999 | Connolly et al. . |
| 6,011,554 * | 1/2000 | King et al. ........................... 345/352 |

* cited by examiner

Fig 4a

| t | h | e |   | q | u | i | c | k |   | b | r | o | w | n |
|---|---|---|---|---|---|---|---|---|---|---|---|---|---|---|
| 1 | 1 |   |   | 1 | 1 | 2 | 2 | 1 |   | 1 | 2 | 2 |   | 1 |
| f | o | x |   | j | u | m | p | e | d |   | o | v | e | r |
| 2 | 2 | 1 |   | 1 |   |   |   | 1 |   |   | 2 | 2 | 1 | 2 |
|   |   | t | h | e |   | l | a | z | y |   | d | o | g | s |
|   |   | 1 | 1 |   |   | 2 |   | 3 | 2 |   |   | 2 |   | 3 |

Fig 4b

| t | h | e |   | q | u | i | c | k |   | b | r | o | w | n |
|---|---|---|---|---|---|---|---|---|---|---|---|---|---|---|
|   |   | 3 |   |   | 1 | 1 |   | 3 |   |   |   |   |   | 1 |
| f | o | x |   | j | u | m | p | e | d |   | o | v | e | r |
|   | 3 |   |   | 3 |   | 3 | 3 | 1 |   |   |   | 3 |   |   |
|   |   | t | h | e |   | l | a | z | y |   | d | o | g | s |
|   |   |   |   |   |   |   |   | 3 |   |   | 1 |   | 1 | 1 |

Fig 4c

| t | h | e |   | q | u | i | c | k |   | b | r | o | w | n |
|---|---|---|---|---|---|---|---|---|---|---|---|---|---|---|
|   |   | 3 |   |   |   |   |   |   |   |   | 3 |   |   |   |
| f | o | x |   | j | u | m | p | e | d |   | o | v | e | r |
|   |   |   |   | 3 |   | 1 |   |   |   |   |   |   | 1 |   |
|   |   | t | h | e |   | l | a | z | y |   | d | o | g | s |
|   |   |   |   |   |   |   |   | 3 |   |   | 1 |   | 1 |   |

METHOD AND APPARATUS FOR IMPROVED MULTI-TAP TEXT INPUT

CROSS REFERENCE TO RELATED APPLICATIONS

This application claims the benefit of provisional application entitled "Touch-Typable Devices Based on Ambiguous Codes and methods to Design Such Devices," filed Dec. 10, 1998, bearing the Ser. No. 60/111,665, the contents of which are relied upon and incorporated by reference.

FIELD OF INVENTION

This invention relates to text-input technology as used in keyboards in which a plurality of symbols may be associated to each of a plurality of input means. More particularly, it relates to an improved multi-tap method of utility for text input on communication equipment in which the number of input means devoted to symbol input is less than the number of symbols potentially input, such as a standard telephone keypad.

BACKGROUND OF THE INVENTION

On the standard telephone keypad letters of the alphabet are associated in groups to keys, and presented in alphabetic order. The key associated to the number 2 is also associated to the letters a,b, and c, the key associated to the number 3 is also associated to the letters d,e, and f, and so on. On cellular telephones, designed to be used in any of a variety of languages, the same keys may be selectably associated to a group of letters and accented letters appropriate to the language. For example, for a phone designed to be used in French, the key associated to the number 2 maybe also be associated to the letters a,b, and c, as well as the accented letters à and á, and also the letter cç. The standard method for accessing these letters is to tap the key a number of times equal to the position of the desired letter in some standard ordering. For example, if the ordering in the example above is a,b,c,à,á,cç, then the user must tap the corresponding key 6 times to access the letter cç. Thus the method is referred to as a multi-tap method. This method has the advantage of being simple to learn, of predictable behavior, and requiring software and hardware of minimal complexity to implement, and these advantages have lead to wide-spread acceptance of this method. However, the method has the disadvantage of requiring more than one keystroke on average to type most texts, and for certain symbols at least, may require a large number of taps per symbol. Most users find these large numbers of keystrokes a burden to perform, and any method which reduces the number of keystrokes is thus of great utility. The present invention teaches such a method, which preserves the advantages of the prior-art multi-tap method of being simple to learn, and requiring minimal software and hardware. It has slightly less predictable behavior than the standard multi-tap method, but this drawback is largely compensated for by the vastly reduced number of keystrokes. This method is generally applicable to any language in which strings of symbols in the language are not typically random, this includes for instance all written natural languages, as well as computer languages, and most synthetic, man-made languages, such as Esperanto and Klingon.

The essential aspect of the invention is to present the letters associated to each input means in the order in which they are most likely to be selected by the user. This order can be determined by analysis of the probability of symbols and sequences of symbols in the language. Indeed, a hierarchy of probabilistic data can be collected, permitting increasingly refined estimates of the likelihood of an ordering.

Prior-art methods to reduce the number of keystrokes using word- or block-based predictive text input, such as the methods described in U.S. Pat. No. 5,818,437 or US provisional application number 60/111,665, inevitably result in unstable displays where the letter which should be displayed at the moment a key is pressed can sometimes not be fully and correctly determined. In these cases, a letter is chosen for provisional display, and further information collected from later keystrokes is used to change the provisionally displayed letter. This effect can be disturbing to users and is a departure from the behavior of the well-known multi-tap method. In order to retain the display stability of the multi-tap method, the present invention does not allow information from subsequent keystrokes to result in changes to symbols displayed as the result of previous keystrokes.

OBJECTS OF THE INVENTION

It is one of the essential objects of this invention to reduce the average number of keystrokes required to input symbols using a multi-tap method or an apparatus embodying this method.

It is a further object of this invention to provide a method and apparatus which can be used for any written natural language.

It is a further object of this invention to provide a display which is stable in the sense that a displayed symbol does not change unless explicit instructions to change are entered by the user.

It is a further object of this invention to accomplish the object of reducing the number of keystrokes required to input symbols using a multi-tap method using hierarchically organized probability information, whereby the data storage requirements of the method can be scaled to match the data storage capacity of the device implementing the method, making the method and apparatus applicable to with small amounts of data storage capability, such as smart cards.

It is a further object of this invention to provide and store positionally dependent orderings information to reduce the number of keystrokes require on average to input a symbol.

It is a further object of this invention to provide a positional differential method to store orderings information, and thus reduce data storage requirements.

It is a further object of this invention to provide a hierarchical differential method to store orderings information and thus further reduce data storage requirements.

It is a further object of this invention to provide a method to allow a given amount of storage allocated to a database of orderings to be used optimally.

It is a further object of this invention to provide a means to synergistically combine the present improved multi-tap method of text entry with ambiguouscode methods for text entry.

It is a further object of this invention to provide an auxiliary input means for advancing symbols in an ordering, thus removing the need for timing information or a symbol-ending input means used in prior-art methods.

Further objects of this invention will be disclosed in the detailed specifiation to follow.

BRIEF DESCRIPTION OF THE DRAWINGS

The following specification will be presented in relationship to a sequence of drawings.

FIG. 4: The excess number of keystrokes required to input an example sentence using the prior-art multi-tap method, and two variants of this invention's improved method.

SUMMARY OF THE INVENTION

Figure 1:
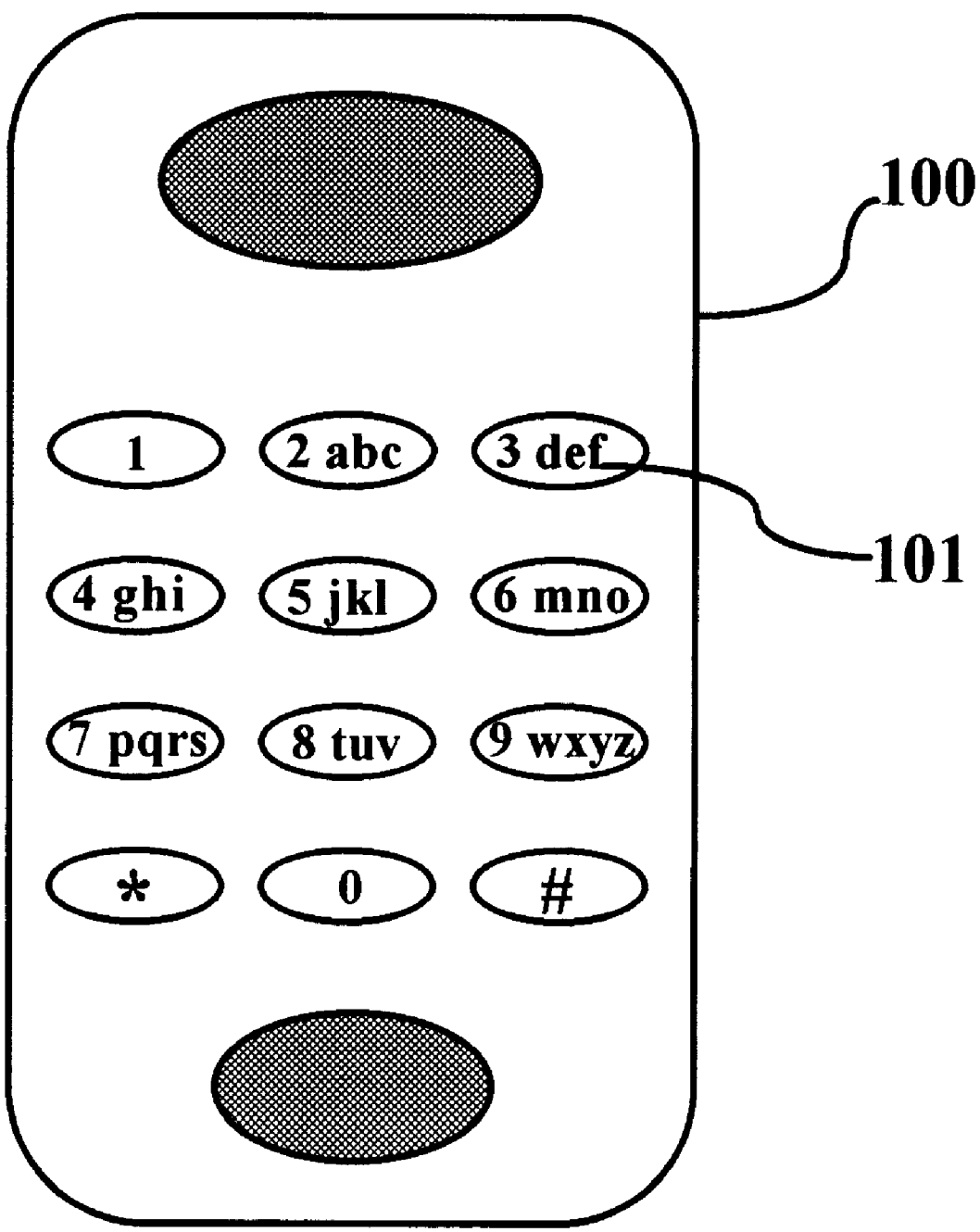
FIG. 1: A schematic drawing of a telephone showing the standard assignment of letters and numbers to keys.

It is well known that in a natural language different letters occur with different frequencies. For instance, in the first sentence of this paragraph, the letter "e" appeared 11 times, while the letter "z" did not appear at all. This is also true of pairs of letters, triples of letters, and so on. In particular, the probability that a given letter occurs may be conditional on which letter or blocks of letters precede the given letter. For instance, in English, if the letter "q" appears in a word, it is much more likely to be followed by the letter "u" than by the letters "v" or "t", even though "t" is a priori more probable than "u" or "v". This information can be exploited to improve the multi-tap method as follows. In the prior-art multi-tap method, one press of the "8" key on the telephone keypad is used to input a "t", two presses of the "8" key used to input a "u", and three presses of the "8" key used to input a "v". That is, the three letters corresponding to the key are presented in alphabetic order. In the present method, when 2- or greater block probabilities are used, an immediately previous selection of the letter "q" in a word will cause the letter "u" to be presented first, before "t" or "v", so that only one keystroke is required to input "u", while two would be required for the prior-art method.

That observation supplies one essence of the invention. Another key observation is that the relative probabilities of letters may depend also on the position within a word. For instance, while, in English, the letter "a" is generally more probable than the letter "b", it is more probable that a word begins with the letter "b" than with the letter "a". Thus, in most positions in a word, "a" should be ordered before "b" in an improved multi-tap method, however, in the first position of a word, "b" should be ordered before "a", in order to reduce, on average, the number of keystrokes required to enter a word. It should be noted here, as will be evident to one skilled in the art, that "average number of keystrokes" could be replaced by another convenient statistic, such as "median number of keystrokes", without changing the essential features of this invention. Thus, throughout this specification, average or expected number of keystrokes could be read as average or exected number of keystrokes or other appropriate statistic on the number of keystrokes.

To make use of block probabilities to predict which letter the user will input next, and thus reduce the number of keystrokes required, a large amount of information concerning blocks and their probabilities may need to be stored. However, there is a great deal of consistency across positions in which ordering of letters is optimal. We have noted that while "a" is generally more probable than "b", in the first position "b" is more probable than "a". In a simple approach, one would store, for each possible position, an ordering of "a" with respect to "b". In this simple approach the information stored is highly redundant. Since the ordering at a given position is typically similar to the ordering at an adjacent position, that is, there is significant continuity across positions, a "differential" approach to storage or ordering information is appropriate. That is, rather than store the ordering at each position, one can store an initial ordering, and then encode changes to this ordering as they occur. This reduces the amount of storage required. If a still greater reduction in storage is required, one can choose to limit the amount of change information stored, and only store the most important changes, where the importance of a change is measured by how much the change impacts the average number of keystrokes used to input text.

A final observation is similar to the observation of positional continuity in that large-block probability information can be expressed as corrections to small-block information. That is, while "t" is generally more probable than "u", and thus should be ordered before "u" in order to reduce the average number of keystrokes, in certain circumstances, such as when "q" appears in the immediately previous position, "u" is more probable than "t". Thus, rather than store the ordering of "u" with respect to "t" for every possible immediately previous letter, one can choose to store information concerning only those exceptional cases in which "u" should be ordered before "t". Depending on exactly how the regular ordering and the exceptions are stored, storing just the exceptions can result in reduced storage requirement. This process will be referred to here as "hierarchical differentiation" and will be explained in more detail in the detailed specification below.

DETAILED SPECIFICATION

FIG. 1 shows a schematic diagram of a telephone 100 showing the standard assignment of letters to keys 101. There are no letters assigned to the key labeled 1, and 3 to 4 letters are assigned to each key labeled 2 to 9, in alphabetic order. In the prior-art multi-tap method, to type the word "car", for instance, one would press the 2 key three times to select the letter "c", and then the 2 key once again to select the letter "a", and finally the 7 key three times to select the letter "r". Thus, to type the word "car" requires a total of 7 keystrokes, 4 more than would be required to type the same word on a standard typewriter keyboard. The number of keystrokes required to type a word on a telephone keypad over and above the number of keystrokes required to type the same word on a typewriter keyboard will be referred to as the excess number of keystrokes. The essential object of this invention is to reduce the excess number of keystrokes to as close to zero as possible.

Consider entering the word "car" on a telephone keypad on which 2 is associated with the letters a,b,c, but these letters are presented in the order c,a,b, and 7 is associated with the letters p,q,r,s but presented in the order r,s,p,q. In this case it would require only 1 excess keystroke to type the word "car", rather than 4 excess keystrokes in the standard multi-tap method. Thus, reordering the letters associated to a key can change the number of excess keystrokes required to enter a word. The number of excess keystrokes can be further reduced if the ordering of letters changes dynamically as words are typed. For instance, if initially the ordering of letters associated to the 2 key were c,a,b, and then, once "c" had been entered, the order changed to a,b,c, while the ordering on the 7 key remained as r,s,p,q, then it would require no excess keystrokes to type the word "car". If the order were always changed so that the first letter in the ordering is the letter the user desired to type, then no excess keystrokes would ever be required.

This ideal situation cannot be obtained in practice, however this invention teaches a method and apparatus by which the ideal situation can be approached quite closely. The method requires the selection of an ordering for each key at each moment in such a way that the expected number of excess keystrokes is minimized, and the apparatus is a device which functions by this method.

Figure 2:
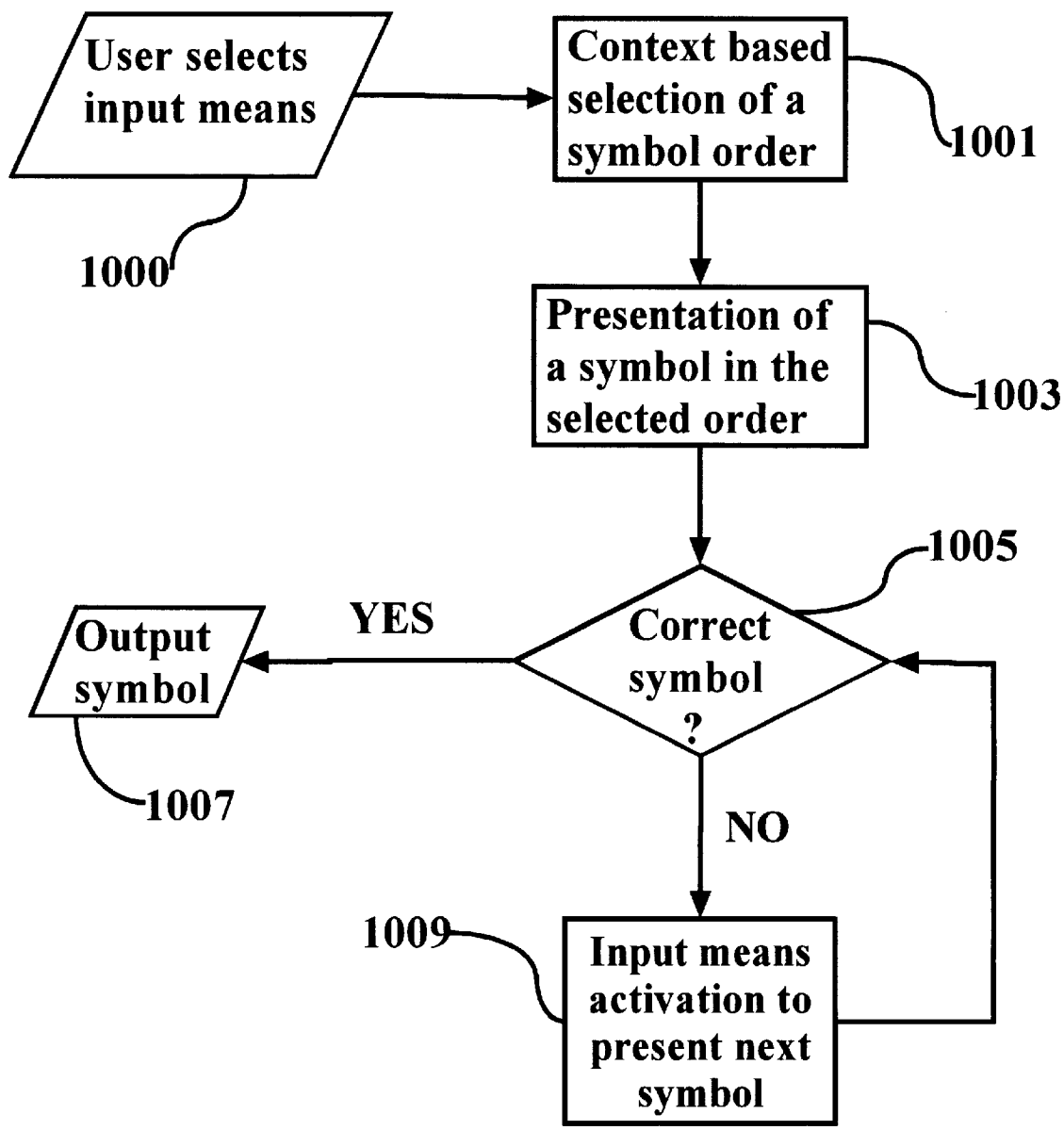
FIG. 2: A flowchart for using the invention.

The way the apparatus is used is explained in reference to FIG. 2. Initially, at step 1000, the user selects the input means corresponding to the symbol that he or she wishes to type. Then, at step 1001 the apparatus invokes means to select an order for the symbols associated to that input means, based on the prefix, that is, based the symbols which have been previously entered by the user. Then, at step 1003, the apparatus presents via a visual or auditory display means, the first symbol in the ordering selected. The user then perceives the symbol, and if the user finds the presented symol to be the desired symbol(step 1005), this symbol is allowed to be output by the apparatus at step 1007. If, however, the presented symbol is not the correct symbol, then (step 1009) the user will activate an input means to present the next symbol in the ordering. In the prior-art multi-tap method, the input means used to present the next symbol in the ordering in step 1009 is the same input means used to present the initial symbol in step 1000. In the improved method taught by this invention, the input means used to advance in the ordering in step 1009 could be the same input means as used in step 1000, or, preferably, it is an auxiliary input means devoted to this purpose, as explained further below.

Steps 1005 and 1009 are repeated alternately until the desired symbol is presented to the user and output.

Figure 3:
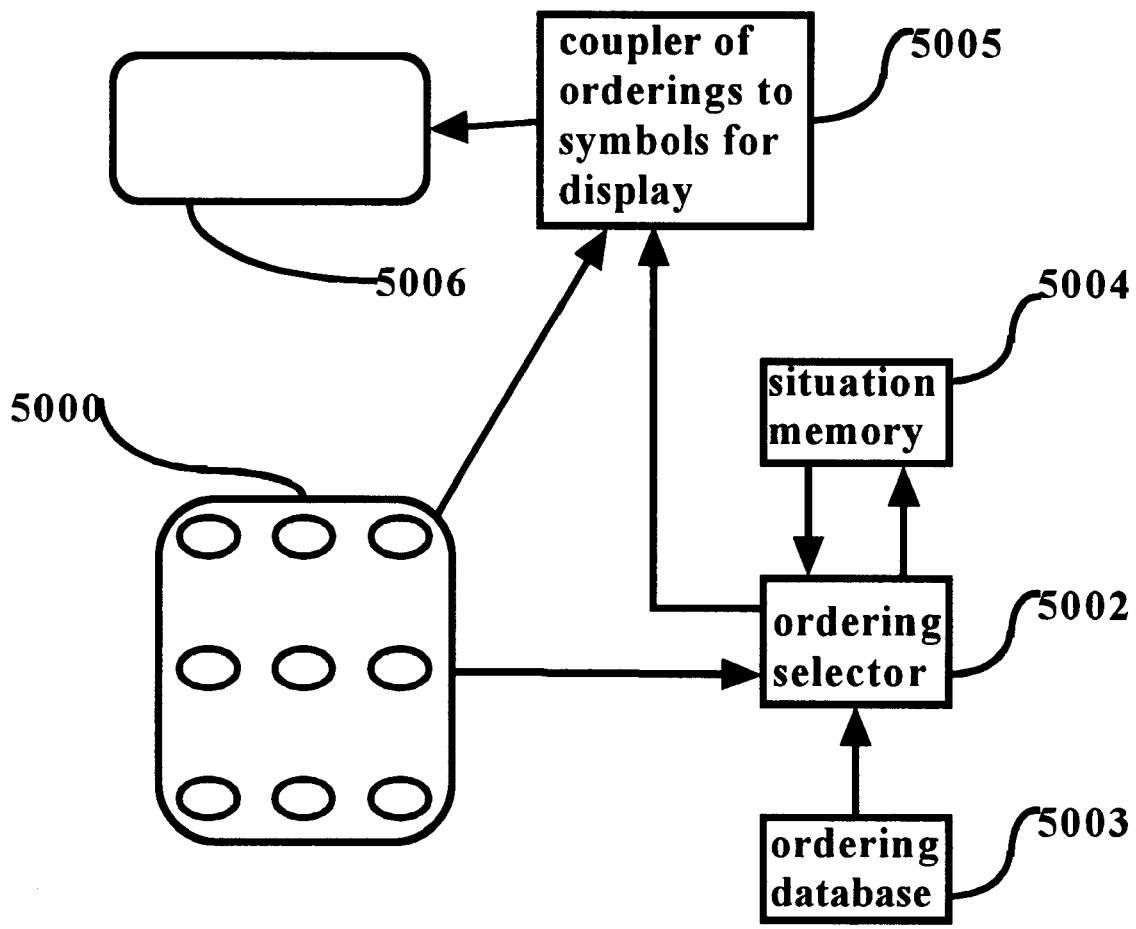
FIG. 3: An overview of the invention.

Referring now to FIG. 3, we examine in overview some of the essential features of the apparatus of this invention. Entry of symbols is via a plurality of input means 5000, typically embodied as a keyboard to be operated by the fingers and thumbs of the user, though the input means could also be embodied in many different ways, such as a voice-recognition system, a breath-velocity detector, and so on. Signals from the input means are transmitted to an ordering selector 5001 which selects an ordering for the display of symbols based on the current input means activation, and, preferably, the recent history of input means activations. When history information is used in an embodiment, said history information is stored in a situation memory means 5003. The orderings selector selects an ordering from the database of orderings 5002 in an appropriate way depending on the current situation, that is, the current input means manipulation, and, preferably, the recent history of input means manipulations. The ordering selected is communicated to the coupler of orderings to symbols for display 5004 which is effective to select a symbol to display on the display means 5005, depending on 1) the set of symbols associated to the relevant input means, and 2) the ordering communicated from the ordering selector 5001. The display means will typically be a visual display means, but could also be an auditory display means which, for instance, speaks the symbol to the user via a voice-synthesis means, or a tactile communication means whereby the symbol is communicated to the user by a vibration, etc.

Prefixes and Positions. For the purposes of this disclosure, the prefix of a symbol is the set of symbols typed immediately preceding the symbol which is to be typed. The terms symbol and letter may be used interchangeably in this disclosure. For instance, in the word "car" the 1-letter prefix of the letter "r" is the letter "a", the 2-letter prefix of "r" is "ca", and the 3-letter context of "r" is "_ca" where "_" is used to denote a space or other punctuation mark. The term position will be used to refer to the number of symbols before a given symbol, up to and including the last punctuation mark. Thus, "r" is in position 3 in the word "car".

It has been discovered that the best ordering for the symbols associated to a given input means is a function of the prefix and of the position of the symbol to be typed using the input means. Thus, in essence, this invention concerns using prefix and/or position information to choose an ordering of the symbols associated to an input means.

Choosing an ordering as a function of a prefix. To simplify the discussion, let us consider a language consisting of three words aba, cca and cac, with probabilities of occurrence of 0.1 0.3 and 0.6 respectively. All of these words can be typed with the 2 key of the standard telephone keypad. In the standard ordering of letters, a,b,c, these words will require 1, 4, and 4 excess keystrokes respectively. The expected number of excess keystrokes per letter is thus (0.1*1+0.3*4+0.6*4)/3=1.23. To reduce the number of excess keystrokes, we would prefer to choose the order c,a,b, since "c" is the most probable first letter, "a" is the second most probable first letter, and "b" never occurs as a first letter. Similarly, at the second position, we find that "a" is the most probable second letter, "c" is the next most probable second letter, and "b" is the least probable second letter, suggesting that the ordering c,a,b be used again at the second position. Finally, at the third position, we would choose the ordering c,a,b again since "c" is the most probable letter in the third position, and "b" never occurs in the third position. By reordering the letters to c,a,b, we reduce the expected number of keystrokes to (0.1*4+0.3*1+0.6*1)/3=0.433, a very significant improvement. We can do better, however, by using prefix information. The following 2-letter sequences occur in these words: ab, ba, cc, ca, and ac, with probabilities 0.05, 0.05, 0.15, 0.45, and 0.3 respectively, ignoring the position in which these prefixes occur. Thus, given that the letter at some position is "a", the probability that the next letter is also "a" is 0, the probability that the next letter is "b" is 0.05/(0.05+0.3)=0.14, and the probability that the next letter is "c" is 0.3/0.35=0.86. We should choose the order c,b,a in order in minimize the number of keystrokes, whenever an "a" has been entered just before the letter which is to be entered next. Similarly, if the previous letter is "b", we should choose the orders a,b,c or a,c,b, and if the previous letter is "c" we should choose the order a,c,b. Using 1-letter, position-independent prefix information, Consider now typing the word "cca". For the first position, there is no letter prefix, and so we use the default ordering c,a,b. Then, since "c" is entered, we use the order a,c,b, and finally, since c is entered again, we again use the order a,b,c. We will enter the word with one extra keystroke. Computing the number of keystrokes for the other words in the same way, we find that the expected number of excess keystrokes for this language is 0.17.

Combining prefix and position information. In the above calculation, we chose an order based on prefix information, ignoring position information. However, by examining these words, we find that if "a" is in the first position, then "b" should be offered as the first choice in the second position, since "a" is only in the first position in the word "aba". However, if "a" is in the second position, then "c" should be offered as the first choice, since "a" only occurs in the second position in the word "cac". In this way, the ordering to choose can depend not only on the prefix, but also on the position in which that prefix occurs. Now we find that we need one extra keystroke to enter the word aba, 1 extra keystroke to enter the word cca, and no excess keystrokes to enter the word cac, giving an expected number of excess keystrokes for the language of (1*0.1+1*0.3)/3=0.13. The expected number of excess keystrokes has been reduced to nearly 1/10 of the expected number of excess keystrokes in the prior-art method.

Given these teachings, it should now be evident to one skilled in the art that one can use prefixes of more than one letter, and languages composed of an arbitrary number of words composed of an arbitrary number of symbols and of arbitrary lengths.

An example sentence. To see the result of applying these teachings to an example sentence, we refer to FIG. 4a. Here, a sentence is shown with the excess number of keystrokes required to enter each letter shown below the letter. For clarity, a blank is used to indicate 0 excess keystrokes. Similarly, the number of excess keystrokes required to input the same sentence when orderings are chosen according to position-dependent prefixes of length 1 (FIG. 4b) and position-dependent prefixes of length 4 (FIG. 4c) are shown. To compute the number of excess keystrokes, a set of reference statistics of the probability of words in English was used. As long as the statistics used to chose orderings are sufficiently representative of a language, results similar to these should be obtained. It is clear that the number of excess keystrokes needed decreases as the size of the prefix used increases.

Figure 5:
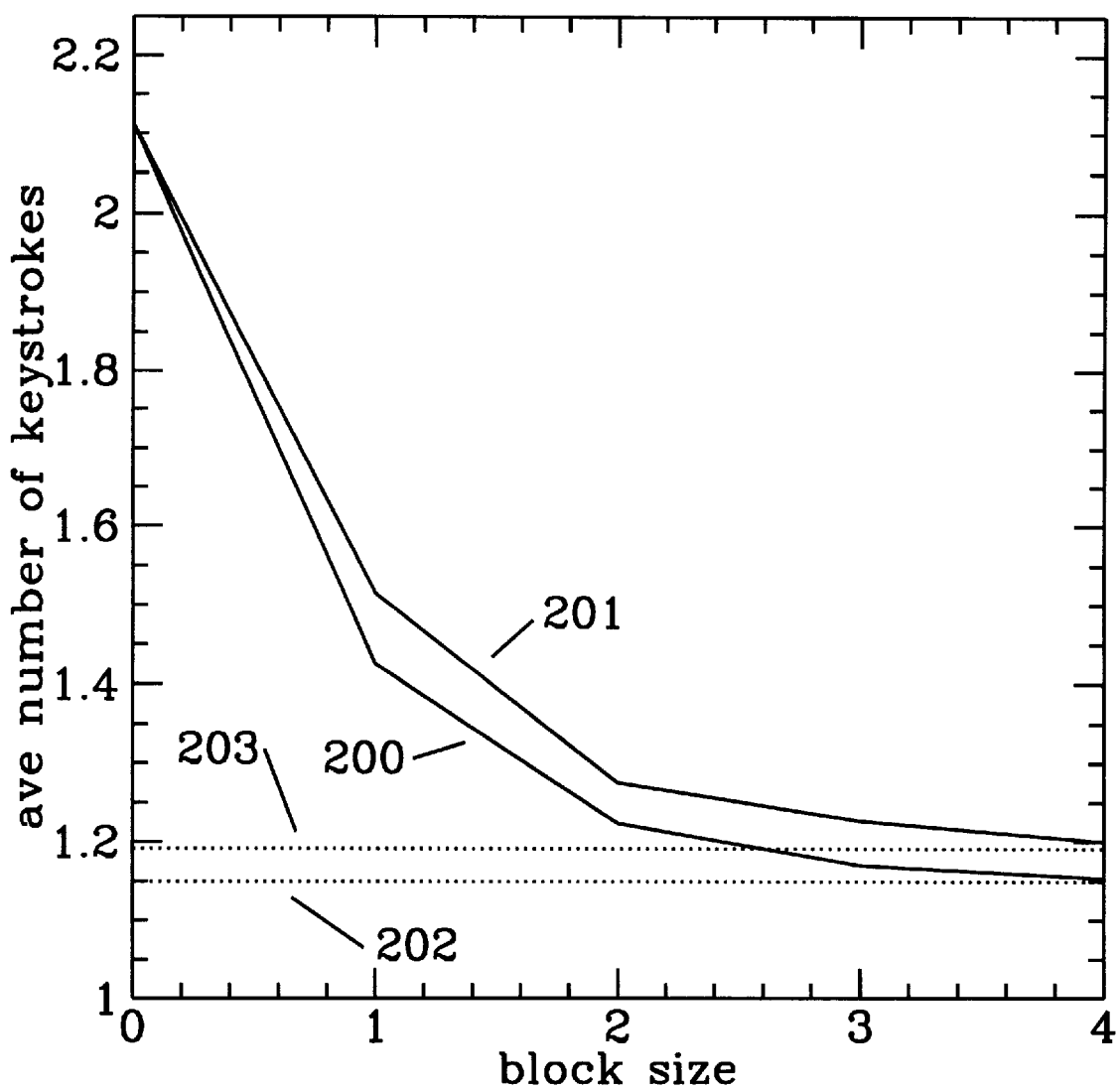
FIG. 5: A graph showing the average number of keystrokes required for 1–4 block position-dependent and position-independent probabilities, for a standard database of probabilities of English words.

Dependence of the excess number of keystrokes on prefix size and position. In order to appreciate the utility of the database compression techniques which will be explained below, and for which patent rights are hereby claimed, it is important to understand the effects of prefix size and position dependence on the expected number of keystrokes. It will be shown that the longer the prefixes that can be used, the greater the improvement of the present invention over the prior-art multi-tap method. However, as the length of the prefixes increases, the amount of storage which is required may increase dramatically, making efficient storage of information a priority. Referring now to FIG. 5, we find data plotted which helps to understand the relative impact of positional information and prefix size on the expected number of keystrokes. Shown on the horizontal axis is the size of prefixes used in a prior-art multi-tap method (size 0 prefix, alphabetic ordering), and prefixes of size 1 through 4 for the improved multi-tap method. Plotted on the vertical axis is the expected number of keystrokes. These data were obtained relative to a reference dictionary of English words, together with their probabilities. The curve 200 shows the expected number of keystrokes when position-dependent prefix information is used, and the curve 201 shows the expected number of keystrokes when positionally information is ignored, and only prefix information is used. It is seen that as the length of the prefixes used increases, the expected number of keystrokes decreases rapidly, for both position-dependent and position-independent data. No increase in prefix length can compensate fully for neglect of positional information, however. With increasing prefix size, both position-dependent and position-independent curves approach an asymptote (curves 202 and 203 respectively), and the position-independent asymptote is higher than the position-dependent asymptote. Nonetheless it is clear that increasing prefix size has a stronger effect than inclusion of positional information, at least up to prefix sizes of 3 or 4.

Figure 6:
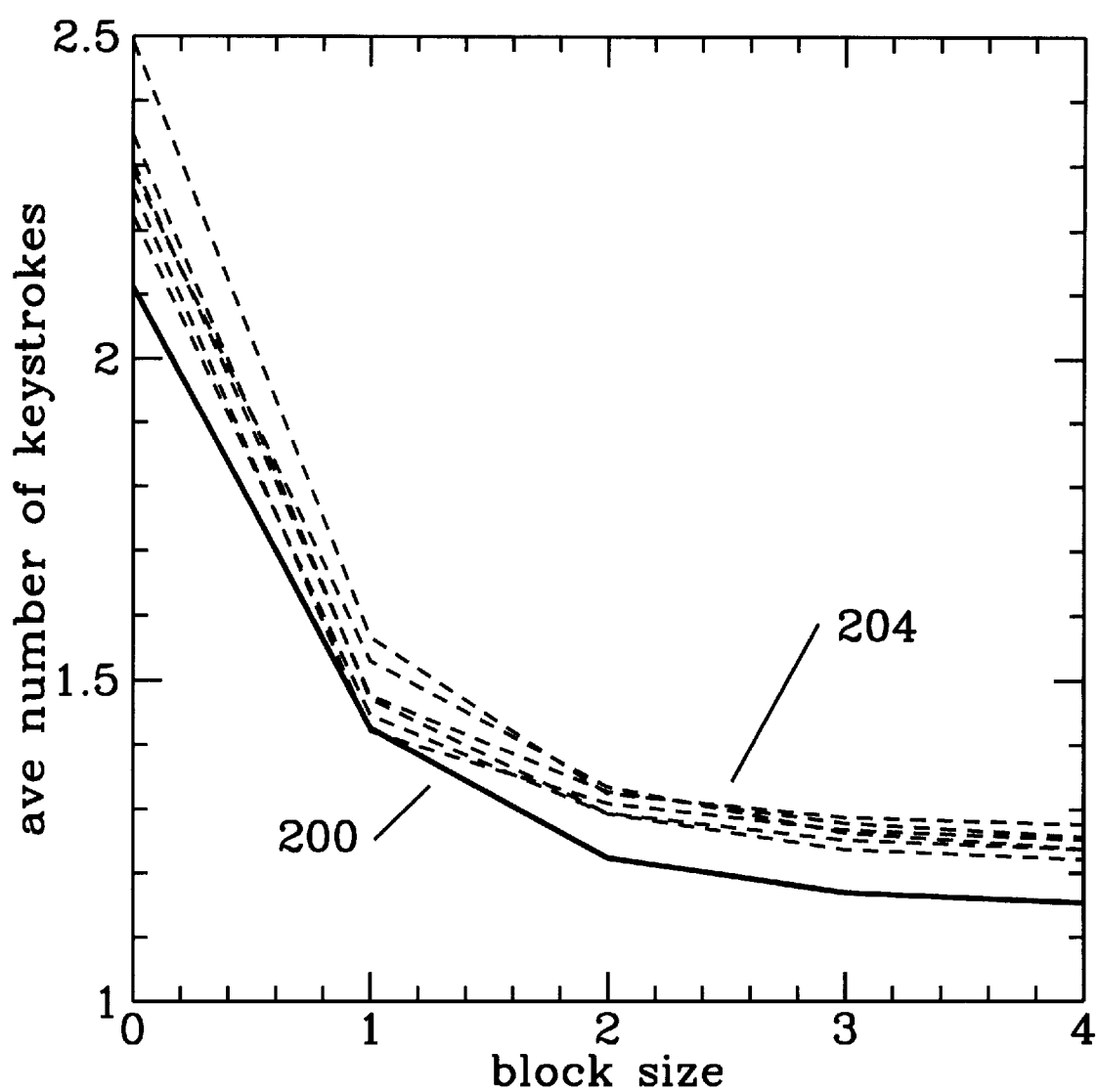
FIG. 6: A graph equivalent to that of FIG. 5, for several other languages using a character set which includes the Roman alphabet.

Referring now to FIG. 6, we see that the effect of decreasing expected number of keystrokes with increasing prefix size is not limited to the English language. Here, the same position-dependent curve 200 from FIG. 5 is shown in relationship with a variety of curves 204 based on data from a variety of other Romance and Germanic languages. While each of these curves follows the same general course, the asymptotic values are higher for the other languages, due to the fact that these languages are written with a larger number of symbols than English, owing to the use of accented letters. Similar curves can be expected for any natural language.

Figure 7:
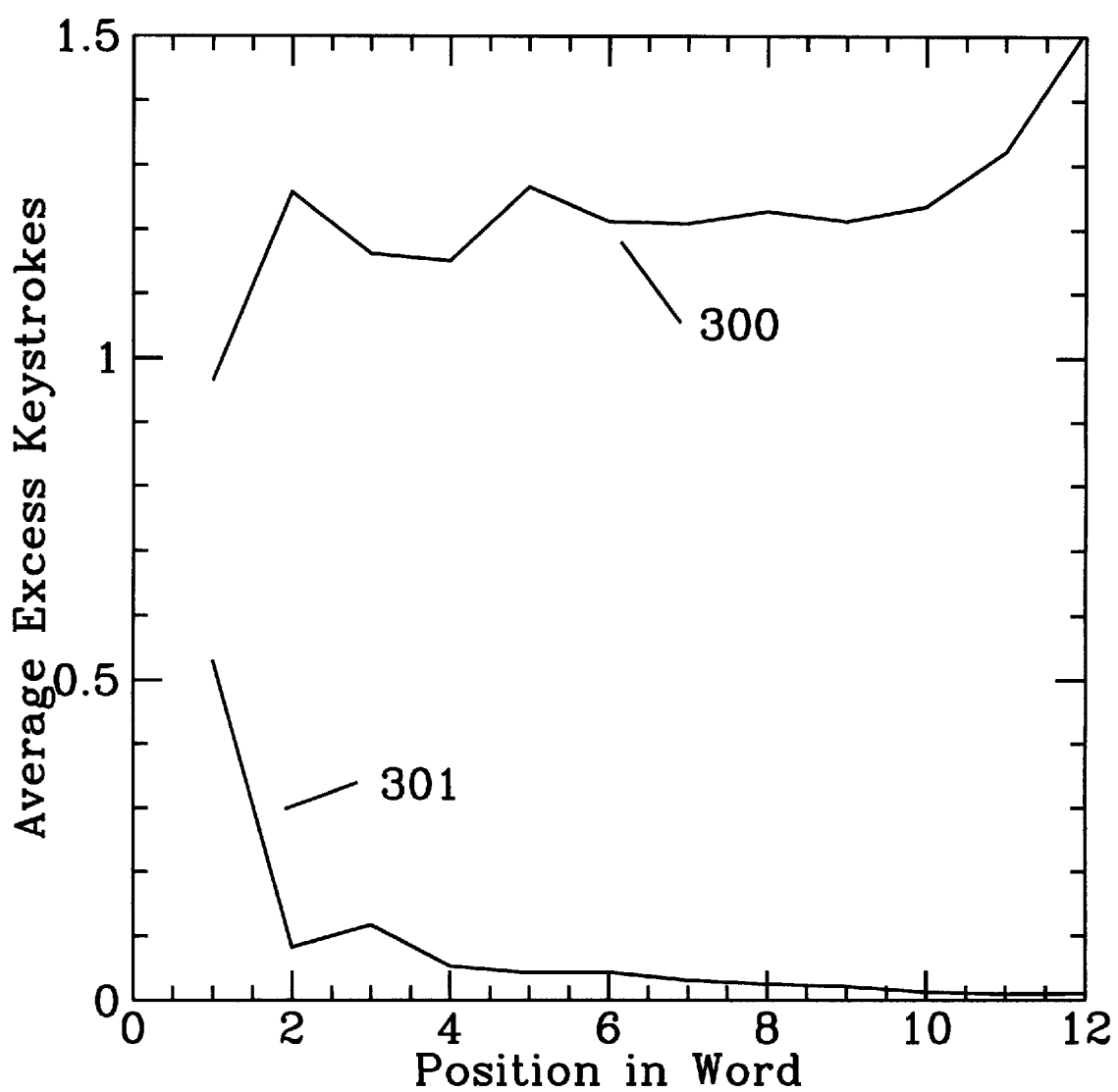
FIG. 7: position dependence of the number of keystrokes, in the prior-art vs. improved multi-tap method.

Another way to grasp the degree to which the present invention improves over the prior-art multi-tap method is by reference to the data presented in FIG. 7. Here, the expected excess number of keystrokes is plotted as a function of position in a word, using the prior-art multi-tap method 300, and the improved multi-tap method taught by the present invention, and using position-dependent information and prefixes of length 4, curve 301. It is seen that for the the prior-art method the expected number of excess keystrokes remains fairly constant or even increases with the position in the word. In the improved method, however, the expected number of keystrokes decreases rapidly with position in the word. Most of the excess keystrokes required to enter a word using the improved method are required to enter the first letter of a word. Once this first letter has been correctly entered, a prefix has been established which allows the desired letter to be presented first in order with an increased reliability. BEST MODE STORAGE METHOD To understand the best mode storage method, consider a topographic map, with large, flat regions such as lakes, and various more rugged features such as mountain ranges. Your task is to make as accurate a model as possible of the map, using as tools a collection of disks of various diameters and heights, which you can stack one upon the other. To succeed, you must not only make an accurate model, but one which uses a minimum number of disks. In regions in which the terrain changes slowly, you can produce a good representation with a small number of large disks. However, when the terrain changes rapidly, you will need a large number of smaller disks to track the changes. If you are only allowed a fixed number of disks to construct your model, there will always be some optimal way to choose the disks so as to produce a high-quality model.

To make the link with the present case, consider the height and width of the disks as corresponding to prefixes and positions within a word. The larger the disk, the smaller the prefix. You can think of the prefix as giving the location of a place on the map to be covered, and the smaller the area is, the longer and more detailed the address needed to specify the area. Finally, the topography of the map corresponds to the variability of the excess number of keystrokes as a function of prefix and position-within-a-word.

More formally, define a pset (permutation set) to be a quadruple (key,prefix,position,permutation). A pset has the following interpretation: If key is pressed, when prefix has been entered at position in a word, then present to the user the symbols associated to key in the order given by permutation. A database of orderings is a collection of psets.

To use a database of orderings to control the presentation of symbols to a user, we need a function MATCH(situation, pset), which determines if a pset corresponds to the current situation, where a "situation" comprises the current prefix to the key just pressed at some moment during text entry, the current position within the word when that keypress occurs, and the key that has just been pressed, that is, a "situation" is a pset with no permutation specified.

We also need a function COMPARE(pset1,pset2) which rates psets relative to each other for their applicability to the current situation.

Figure 8:
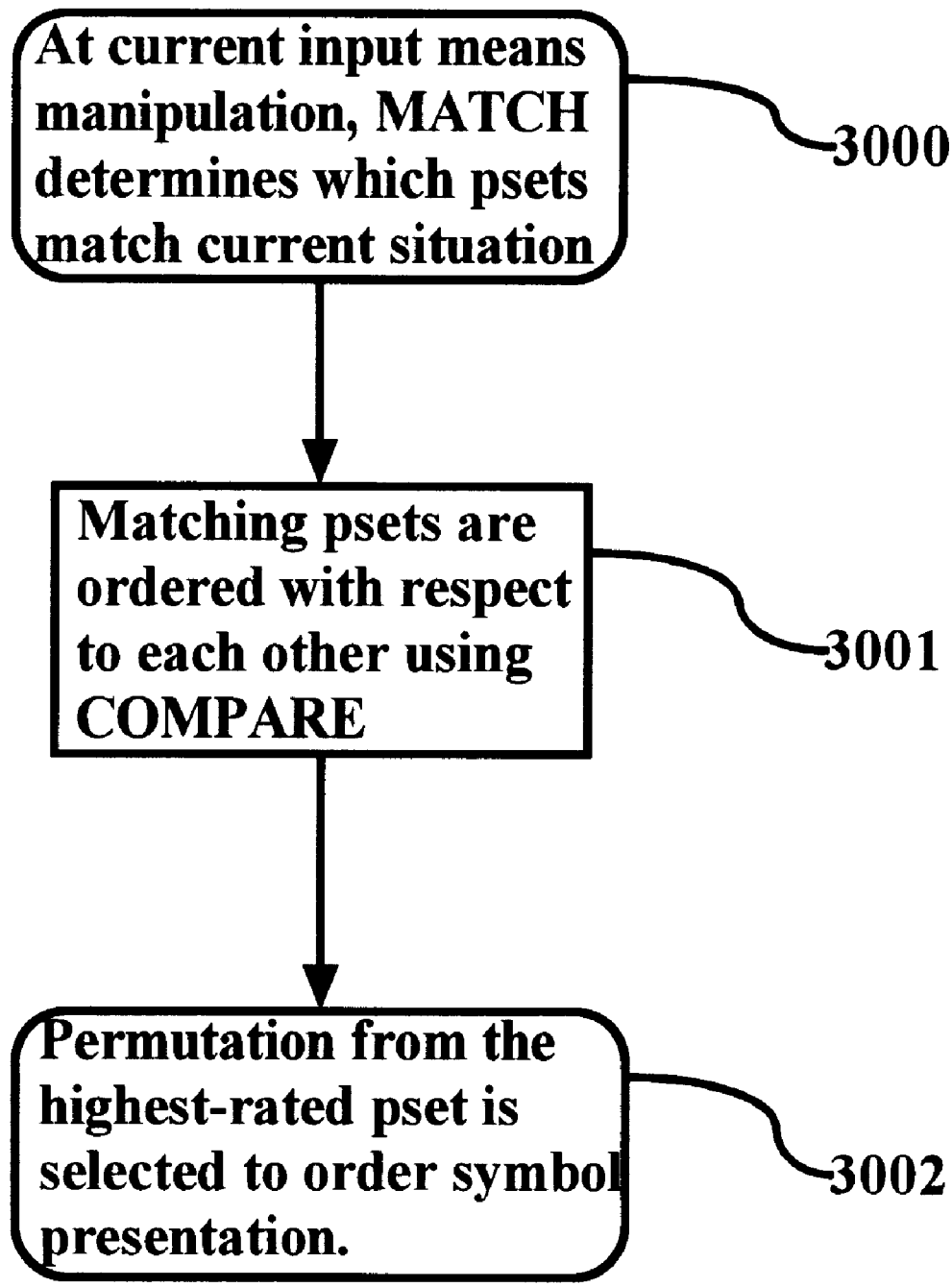
FIG. 8: Flow chart for using the best-mode storage method.

The use of MATCH and COMPARE can be understood by reference to FIG. 8. In the first step 3000, and for each pset in the database, MATCH determines if the current prefix corresponds to the input pset, if the current position is compatible with the position in the pset, and if the key of the pset corresponds to the key which has just been pressed. It is obvious how to determine correspondence in terms of key. To correspond in terms of position, the position of the pset must be less than or equal to the current position. To correspond in terms of prefix, the prefix of the current situation must contain the prefix of the pset. Containment is determined by comparing the prefix of the pset to the current prefix letter by letter, beginning with the letter just before the current position, and working backward toward the beginning of the word. For instance, if the current prefix is _ga, then psets with either the prefix a or the prefix ga match the current situation, any other prefix, such as fga does not match the current situation, except the NULL prefix, which matches all prefixes.

After the completion of step 3000 all psets have been identified as matching or not matching the current situation. In step 3001, all those psets which match are ordered with respect to each other using the function COMPARE.

In constructing the database, a process to be discussed further on, a decision was made to rate positional correspondence above prefix correspondence, or vice versa. Without loss of generality, let us assume that positional correspondence is rated above prefix correspondence. Then, given two psets, pset1 and pset2, COMPARE will return pset1 if the position of pset1 is closer to the current position, and pset2 otherwise. The pset returned will be placed higher in the ordering than the other pset. If the positions of pset1 and pset2 are the same, then COMPARE will return the pset with the longest prefix.

Once all the matching psets have been sorted relative to each other using COMPARE, there is one highest-rated pset. In step 3002 the permutation of this pset is chosen for use in ordering the symbols to be presented to the user.

CONSTRUCTION OF A DATABASE OF ORDERINGS

Figure 9:
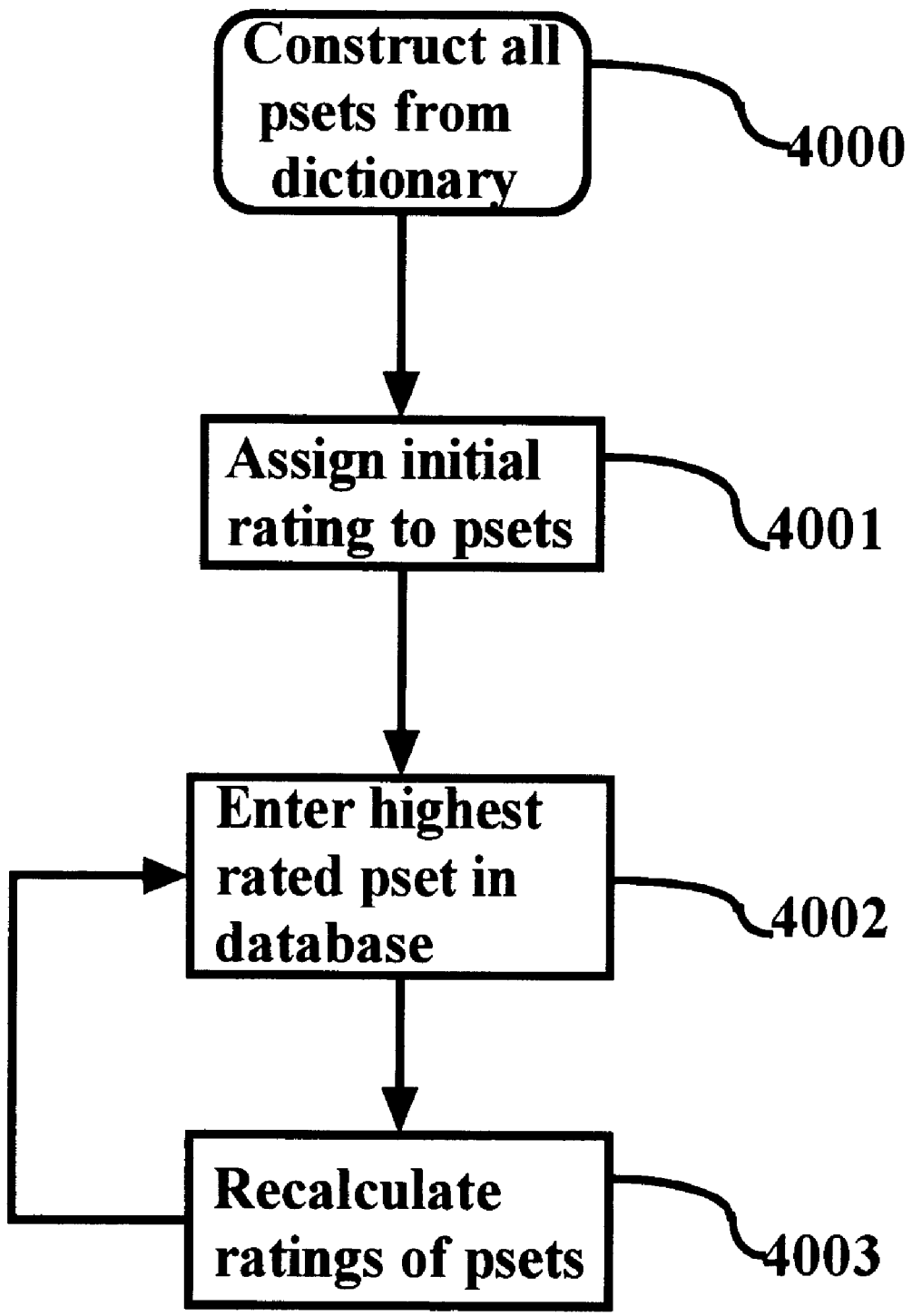
FIG. 9: Flow chart for construction a database of orderings as used in the best-mode storage method.

The best-mode method for constructing a database of orderings will be described in reference to FIG. 9. In the first step of database construction 4000, all possibly relevant psets are constructed from a database of words (a dictionary) along with their probabilities. The probability to assign to the pset is the probability that it will match the current situation at any given time. The probabilities will be used to give a rating to the psets. All possible psets includes all possible choices for key, prefix (including the null prefix) and position which occur in words in the dictionary, each of these choices of key, prefix, and position associated to each possible permutation of the symbols associated to the key.

The number of such psets is finite since the number of keys is fixed, no prefix can be longer than the largest word in the dictionary, and no position can be larger than the length of the longest word. Still, the number of possible psets could be quite large, and one may decide to limit the number of psets a priori by fixing a longest prefix to be considered, binning the positions into a small number of bins so that positions within a bin are considered equivalent, etc.

Next, in step 4001, an initial rating is assigned to each of the psets. This rating is based on the reduction in the expected number of keystrokes required to enter the words in the dictionary, if the given pset were to be included in the database of orderings, relative to the expected number of keystrokes required when the symbols are presented in some initial default ordering, such as alphabetic ordering. This reduction can be calculated rapidly, since, for each pset, one only need consider the words to which the pset matches, and count the number of excess keystrokes required if the pset were to be used. For instance, if the dictionary consists only of the word "the", then only those psets with (position, prefix) pairs: (1,NULL), (2,NULL), (2,t), (3,NULL),(3,h), and (3,th) need to be considered (NULL represents the null prefix, that is, no prefix at all). For each of these psets, and for each possible permutation, the reduction in the number of excess keystrokes is computed.

Once all psets have thus been rated, that pset with the largest rating, that is, the pset which produces the maximal reduction in expected number of keystrokes, is entered into the database of orderings (step 4002). If there is more than one maximally rated pset, the one with the lowest position is chosen, if all have the same position, then the one with the smallest prefix is chosen, and if all have the same size prefix and same position, one of them is chosen at random.

Now, to find the next pset to be included in the database 4003, the ratings of all the psets has to be recalculated. The rating of a pset is now based on the reduction in the number of keystrokes relative to the default orderings and the database of orderings thus far constructed. Consider, for example, the case given above in which the only word in the dictionary is "the". Assume that the pset (4,2,NULL,hig) (meaning: for key 4, pressed at the second position, regardless of prefix, present the letters in the order h,i,g) has been selected at step 4002 for inclusion in the database. Now the pset (4,2,t,hig) will have a 0 rating: any effect it might have has already been accounted for by the pset included in the database. Note that initially the psets (4,2,NULL,hig) and (4,2,t,hig) have the same rating, and, given the rule that if two psets have the same rating, the one with the smallest prefix is chosen, (4,2,NULL,hig) would be inserted in the database rather than (4,2,t,hig). This preference accomplishes hierarchical differentiation. Similarly, the psets (a) (3,1,NULL,edf), (b) (3,2,NULL,edf) and (c) (3,3,NULL, edf), which mean respectively (a) if key 3 is pressed, at any position 1 or greater, and regardless of prefix, use the order e,d,f, (b) if key 3 is pressed, at any position 2 or greater, and regardless of prefix, use the order e,d,f, (c) if key 3 is pressed, at any position 3 or greater, and regardless of prefix, use the order e,d,f, each have the same effect on the excess number of keystrokes required to enter the word "the". Given the rule that if psets have the same prefix and the same rating, the one with the lowest position is preferred, pset (a) will be chosen. This rule accomplishes positional differentiation.

Steps 4002 and 4003 can now be repeated as many times are required to find additional psets to include in the database. At each iteration, ratings will have to be recalculated for certain psets, those which could be affected by the last added pset to the database. Only those psets which have a position greater than or equal to the last added pset, and have a prefix which includes or is included by the prefix of the last added pset, and apply to the same key as the last added pset need have their ratings recalculated, and only these psets need to be resorted in relationship to the other psets.

This process describes the construction of a database of orderings essentially ab initio. In practice one might wish to begin the process by first including some larger subset of orderings known to be useful, such as all orderings with prefixes up to length 1. Regardless of the initial set of psets, addition of psets can proceed as described above.

This best mode method is but one of an infinite number of embodiments of the general principles taught by this invention for reducing storage requirements. These principles are two: 1) positional differentiation, in which advantage is taken of the fact that typically positions nearby each other will require similar orderings, and 2) hierarchical differentiation, in which advantage is taken of fact that longer prefixes will typically require orderings similar to the orderings consistent with shorter prefixes. The best mode storage method combines these principles in a way which is particularly useful when an amount of storage to be allocated to the database of orderings is fixed in advance. Using the best mode method, whatever storage is available for the database can be filled in a way which is optimal for reducing the expected number of keystrokes.

AUXILIARY INPUT MEANS FOR MULTI-TAP INPUT

In the prior-art multi-tap method, some method must be used to distinguish multiple taps which are meant to advance in the ordering of symbols and multiple taps which are meant to input new letters. For instance, the word "cab" is typed entirely using the 2 key, with three taps, one tap and two taps for the letters c,a and b respectively. Grouping these taps to represent letters is usually done in one of two ways, 1) a timing mechanism is used: closely spaced taps are interpreted as being in the same group, while a longer space between taps encodes the beginning of a new group, or 2) an auxiliary key, typically the # key on the telephone key pad, is used as a letter-ending symbol, so that "cab" is entered as 222#2#22#. The first of this methods has the drawback of limiting the speed at which a user can type. Such a keyboard requires the user to type neither too quickly, nor too slowly. It is particularly unsuited for the improved multi-tap method taught by this invention. The second method has the drawback of added an extra keystroke for each letter, further slowing input.

Figure 10:
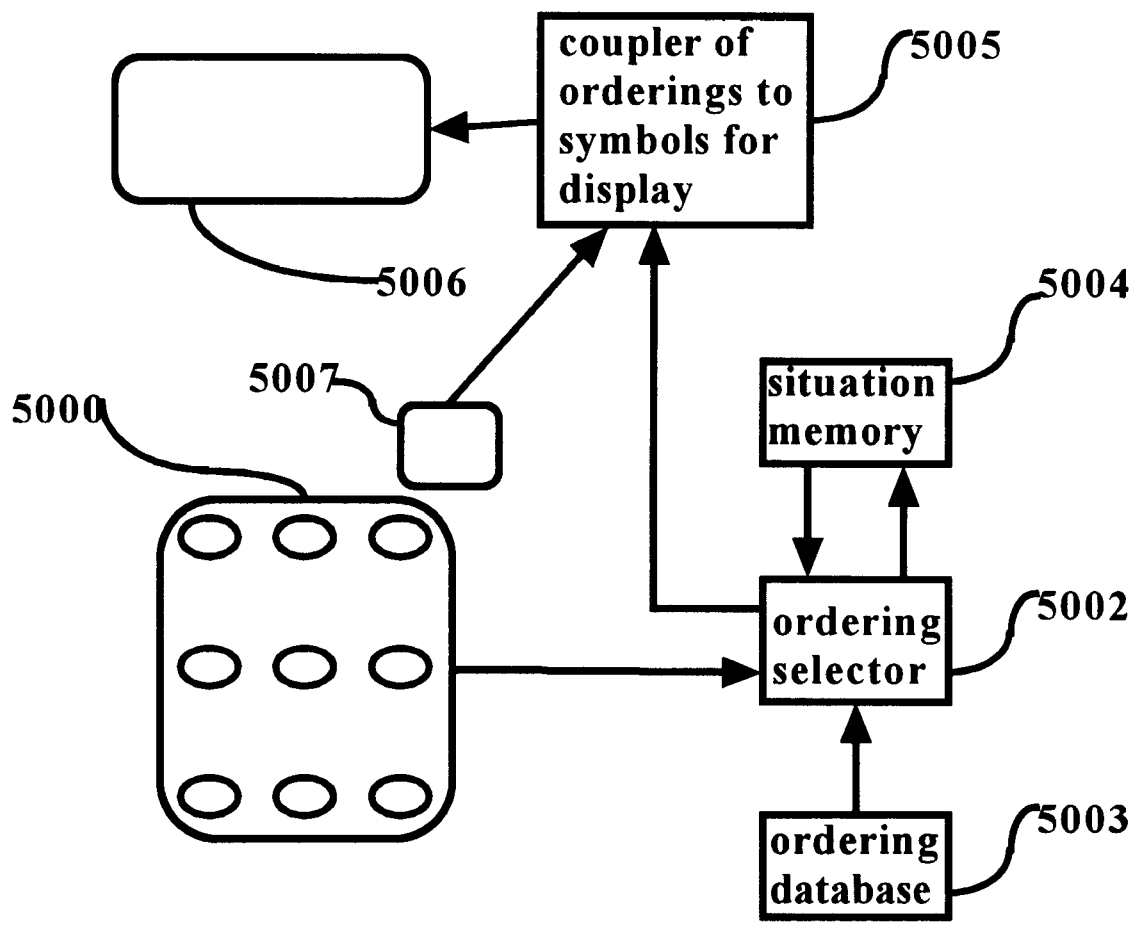
FIG. 10: The overview as in FIG. 3, further comprising an auxiliary input means for advancing symbols in an ordering.

This invention thus provides for an auxiliary key to be used to advance symbols in a given ordering. Referring to FIG. 10, we see how this auxiliary input means can be integrated into the apparatus of this invention. The auxiliary input means 5007 communicates with the coupler of orderings to symbols for display 5005 in such a way that each manipulation of the auxiliary input means 5007 causes the symbol displayed to be advanced one in the ordering. This auxiliary key could be applied as well to improve the standard multi-tap method. In this case the order does not depend on context, still the auxiliary input means apparatus can be applied to advance symbols in the given, fixed ordering.

INTEGRATION OF MULTI-TAP METHODS WITH AMBIGUOUS CODE METHODS

Following the teachings of this invention, the improved or prior-art multi-tap method can be use in integrated combination with ambiguous code methods, such as those taught in US provisional application number 60/111,665 (GUTOWITZ '98), which is hereby incorporated by reference. For definiteness, we will describe a combination with the embodiment of GUTOWITZ '98 in which several selected letters are input by substantially simultaneous manipulation of two input means. The worker skilled in the art will be able to extend these teachings to combination with any other ambiguous code method. However, if this combination is not done properly, then the benefits of the ambiguous code method can be compromised by the ambiguity introduced by the combination with the multi-tap method. A particularly effective method for combining multi-tap and ambiguous-code methods, for which patent rights are hereby claimed will now be described.

It was shown in GUTOWITZ '98 that operation of an auxiliary input means with one of the letter keys of the standard telephone keypad can serve to encode a selected letter, and that, further, if the letters encoded in this way are selected to be c,e,h,l,n,s,t,y then the ambiguity, as measured by lookup error and query error, is substantially reduced as compared to the standard ambiguous code. We will therefore adopt this code for the present discussion. One way to combine those teachings with the teachings of the present invention is to combine evidence from both multi-tap input and ambiguous code input to select a most-likely word or letter from a set of possible words or letters.

Figure 11:
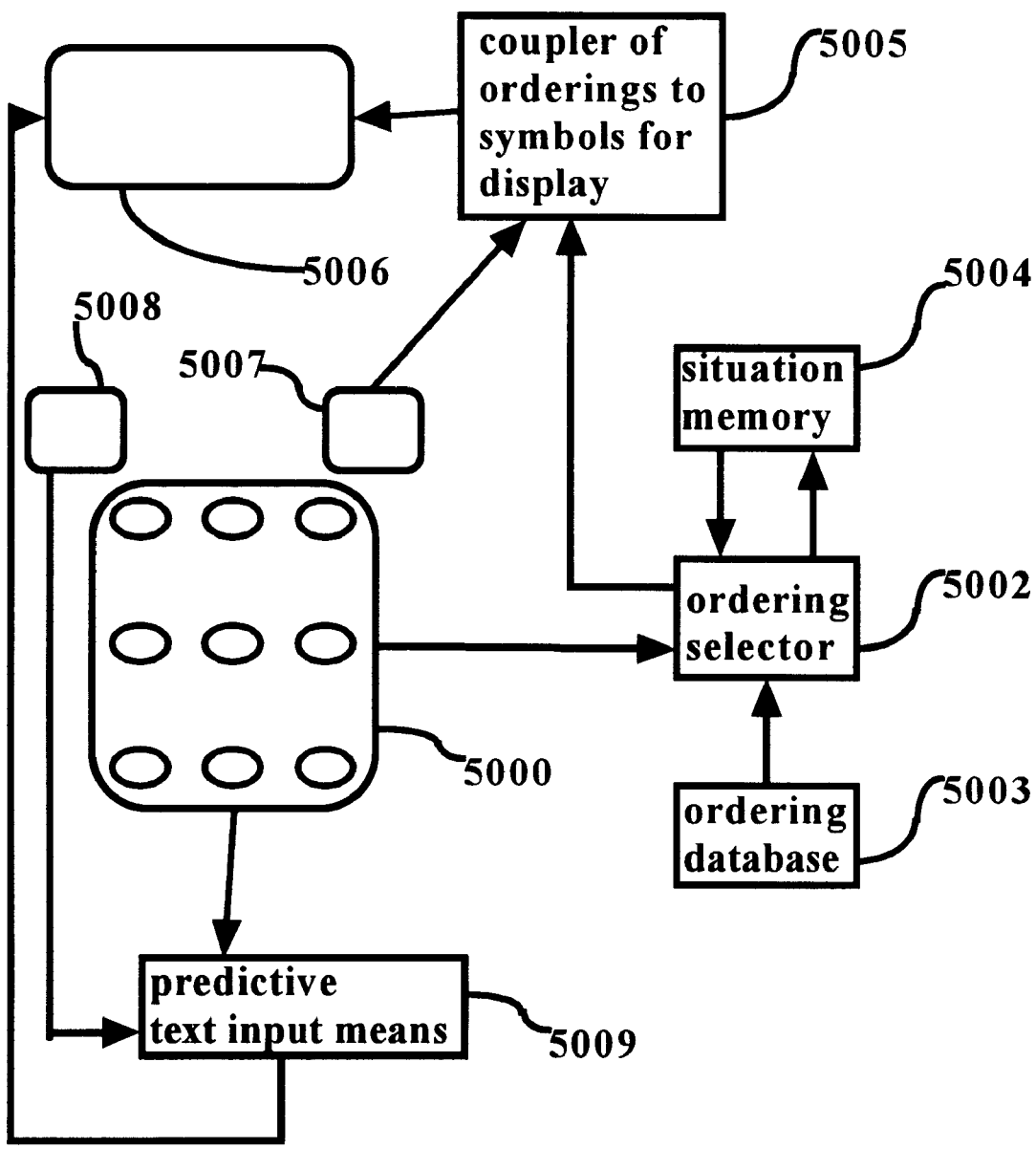
FIG. 11: The overview as in FIG. 10, further comprising a predictive text input means, and an auxiliary input means for use in conjunction with the predictive text input means.

Referring now to FIG. 11, we find a schematic overview of an apparatus in which both a multi-tap and a predictive text input means are integrated. The multi-tap components of this figure have been already presented in detail. Component 5009 is a predictive text input component, which could be for instance, one of the predictive text input embodiments described in GUTOWITZ '98. For the embodiment to be discussed in more detail below, that embodiment in which selected letters from each input means which encodes letters are selected by manipulating an auxiliary input means in conjunction with one of the letter-encoding input means, an auxiliary input means for predictive text input is required. This auxiliary input means is shown in FIG. 11 5008, and is preferably distinct from the other input means of the apparatus, in particular, the auxiliary input means for multi-tap input 5007, when said auxiliary input means for multi-tap input is present in the apparatus.

Consider an extreme case in which a user may at any moment choose to use either the ambiguous code method or the improved multi-tap method. Most words could be entered in a variety of ways. For instance, consider entering the word "bed". We will assume for this example that the order c,a,b is always chosen by the improved multi-tap method for the letters associated to the 2 key, and the order d,e,f is always chosen by the improved multi-tap method for the letters associated to the 3 key. We will use a space to denote operation of a letter ending means, such as a timeout. For the ambiguous code method, we will write $\hat{2}$ to indicate operation of the auxiliary key in combination with the 2 key, $\hat{3}$ to indicate operation of the auxiliary key with the 3 key. Using only the improved multi-tap method, the word "bed" would be entered as 222 33 3, and using the ambiguous code method as 2$\hat{3}$3. Now imagine that the user types 2$\hat{3}$3, and we allow interpretation by both the ambiguous code and improved multi-tap methods. When the sequence 2$\hat{3}$3 is received, we do not know if the user intended only the second letter to be typed using the ambiguous code method, or all of the letters, or only the first and second letters, or only the second and third letters. Thus, this sequence could be interpreted as "bed" (pure ambiguous-code interpretation) or "ced" (first and/or third letters are multi-tap). However, assuming that "ced" is not a word in the dictionary, this hypothesis can be rejected, and the sequence rendered as "bed".

Consider now the sequence 22 3 3, in improved multi-tap this is "add", and in the ambiguous-code interpretation "aadf", "abdf", "badf", "bbdf", "aafd", "abfd", "bafd", "bbfd", "aadd", "abdd", "badd", "bbdd", "aaff", "abff", "baff", "bbff". Let us assume that one of these, for instance, "baff" is a word. Now there are two possible interpretations of the input sequence, "add" or "baff" and a query would need to be presented to the user, to allow the user to select the interpretation which is meant.

These examples show that both multi-tap methods and ambiguous code methods can be operational at the same time. In the case of conflicts or ambiguities, queries can be presented to the user to allow the user to resolve the conflict or ambiguity.

BEST MODE OF INTEGRATION WITH AMBIGUOUS CODES

Many variant methods for integrating ambiguous-code and multi-tap methods may be designed. For instance, based on the data presented previously, one good method could be to use multi-tap systematically for the first letter of a word, and then the ambiguous-code method systematically for all the other letters of the word.

The best mode for synergistic integration of ambiguous-code and multi-tap methods emerges from several inventive insights: 1) multi-tap methods will be of most use for words not likely to correctly rendered by an ambiguous code method, such as proper names, 2) users are unlikely to want to use both ambiguous-code and multi-tap methods within a single word, 3) by using a distinct auxiliary input means for ambiguous-code input and another distinct auxiliary input means for multi-tap input, it can be relatively easy to determine if a user means to use the ambiguous-code method or the multi-tap method to enter any given word, 4) but using sequential signals, that is, by having operation of the ambiguous-code auxiliary input means precede the letter to which it refers, and the multi-tap auxiliary input means succeed the letter to which it refers, the ambiguity introduced by possibly simultaneous interpretations in terms of ambiguous-code or multi-tap methods can be reduced.

Thus, the best mode for synergistic combination of ambiguous-code and multi-tap input can be understood in more detail as follows.

Most of the ambiguities resulting from multiple interpretations due to combinations of multi-tap and ambiguous code methods are due to letter-boundary confusions in the multi-tap method, be it the improved multi-tap method or the prior-art multi-tap method. That is, for example, one does not know if a repeated sequence, such as "22" should be considered as representing a single or several letters. Since in the improved multi-tap method, the probability of needing multiple taps to input a letter is small, multiple taps can be ergonomically accomplished by means of an auxiliary input means operated in conjunction with a letter-encoding input means. Let us represent by *2 the operation of an auxiliary input means with the 2 key. Then, if the order of letters on the 2 key is c,a,b, then c is encoded by "2", a by "2*2", and b by "2*2*2". Now, using the notation as above for 2̂ meaning operation of the auxiliary input means for ambiguous-code input on the 2 key, the word "cab" can be entered as 22*22*2 using just the multi-tap method, or 2̂22 using just the ambiguous-code method. If both input methods are available simultaneously, then the user can chose to enter "cab" in any of the following ways: 2̂22, 2̂2*22, 2̂2*22*2*2, 2̂22*2*2, 222, 22*22, 22*22*2*2 and 222*2*2.

These 8 possibilities can in part be uniquely associated with letter sequences: a "star" sequence can only be read in one way, and a "^" sequence can only be read in one way. Thus, the 8 possibilities can be rendered: ĉ22, ĉa2, ĉab, c2b, 222, 2a2, 2ab, 22b. Here, partial sequences have been replaced with letters whenever this can be done unambiguously. Each of the remaining 2's in these sequences represent a "c" if interpreted in a multi-tap interpretation, and "a" or "b" if interpreted in an ambiguous code interpretation. Thus each 2 can be any of a,b, or c. If only by virtue of the sequence "222", any of the 9 possible permutations of a,b,c, are possible and thus this example reduces to coding using the standard ambiguous code.

This example is an extreme case which illustrates all of the possible combinations of coding using the standard ambiguous code, a reduced-ambiguity code, and a multi-tap method. In this example the additional ambiguity due to the possibility of interpretation in either a multi-tap mode or a reduced-ambiguous-code mode, resulted in a total ambiguity which is no less than that of the standard ambiguous code. In a typical case, however, additional information input by means of manipulation of the auxiliary input means will serve to reduce ambiguity relative to the standard ambiguous code.

According to the best mode of operation of this invention, the ambiguity due to possible simultaneous interpretations in terms of an ambiguous code or a multi-tap code can be reduced by creating a precedence relationship between the two possible interpretation mechanisms. The following convention is optimal in that 1) it allows for multi-tap input to be used for words which are not likely to be in the dictionary, and thus not likely to be correctly interpreted, and yet 2) allows words which are likely to be in the dictionary to be typed using the ambiguous-code method, and 3) permits learners of the ambiguous-code method to make a smooth transition from multi-tap in ambiguous-code input during the learning process. The convention is that words are to be interpreted in a multi-tap interpretation unless any of the letters in the word are entered using the ambiguous-code auxiliary input means. The reverse convention is also possible.

For typical words, one or the other of the auxiliary input means will be required to enter the word, and thus it is straight forward to determine if the user meant to enter the word using the multi-tap or ambiguous code method. We have seen that for English there are on average 15% excess keystrokes per letter, and thus, for each letter, a 15% chance to use the multi-tap auxiliary input means, for devices which use an auxiliary input means in the multitap mode. Since the average word in English is approximately 5.5 letters long, there is a 60% chance that the multi-tap auxiliary input means will be used at least once in any given word. In the same way, for the reduced-ambiguity ambiguous code described above, the auxiliary input means has a 45% chance of being used to enter any given letter, and thus a 96% chance to be used at least once while entering an average word when the word is entered using this method. Thus, most of the time, it can easily be determined in software which method the user intended to use on any given word according to which of the auxiliary input means was used in the course of entry of the word. If neither of the auxiliary input means is used in a given word, some default arrangement may be made, preferably, to interpret the word in the ambiguous-code method.

While the user is learning the use of the ambiguous code auxiliary input means, it may be preferable to adopt the multi-tap interpretation for all letters, except those entered using the auxiliary input means for ambiguous-code text entry. In this way, the use of the auxiliary input means for ambiguous-code text entry can be introduced gradually, and will always provide some benefit in enabling the user to enter certain letters directly and unambiguously, without passing through a multi-tap interpretation.

Though it may not contribute to reduction in total ambiguity, it is considerably more ergonomic to perform the combination of auxiliary input means with symbol encoding means in two different ways, depending on whether the auxiliary input means associated to the ambiguous-code method, or the auxiliary input means associated to the multi-tap method is concerned. In the case of the ambiguous-code auxiliary input means, the auxiliary input means activation should occur before or during the activation of the symbol-encoding input means to which it refers, while in the case of the multi-tap method, the auxiliary input means activation should occur after the activation of the symbol-encoding means to which it refers. In typical use, the ambiguous-code entry method will be used words expected by the user to be in the dictionary, while the multi-tap method will be used for words which the user expects not to be in the dictionary.

OPTIMIZATION OF CODE FOR REDUCED NUMBER OF KEYSTROKES

Multi-tap typable devices are not touch typable: each symbol is not always gotten by the same sequence of input means manipulations. Nonetheless, many of the methods used for typable device optimization disclosed in GUTOWITZ '98 can be applied to multi-tap devices. According to the teachings of the present invention, one essential ergonomic criterion for multi-tap methods is the expected number of excess keystrokes. Following the teachings of GUTOWITZ '98, the excess number of keystrokes could be reduced by choosing an optimal assignment of symbols to keys. In particular, alphabetic ordering could be maintained while reducing the number of keystrokes, by choosing an optimal partition of the symbols.

ALTERNATE CHOICE OF STATISTICS

Up to now, we have been considering choosing orderings with respect to statistics drawn from a representative sample of the language to be typed. In some circumstances, other orderings may be preferred. For instance, when the improved multi-tap method and apparatus taught by the present invention is used to enter and access names and addresses in a database on a handheld device such as a cell phone or personal digital assistant, then the relevant statistics are those of names and addresses, not those of general language. Indeed, one might choose statistics drawn from a large set of names typical of a language when the device is used for entering names, and the statistics of the names already input into the device when the device is used to access names. In the latter case, the weighting of letters and prefixes could be a function of the number of times the names and addresses in the database have been accessed, rather than statistics based on the general usage of such names by a population of users.

Distant database storage. The database of orderings need not reside on the physical device used for text entry.

Consider, for instance, an automated corporate switchboard which permits callers to be connected to employees when the caller enters the name of the employee by typing on a telephone keypad. The optimal orderings may be different from the optimal orderings for entering unrestricted language, and the automated switchboard could communicate selected orderings to the caller's phone, interactively as the caller types. Such a setup presents a number of advantages: not only are the orderings adapted to the corporation's telephone data, but also, minimal storage and processing is required in the user's handset. Preferably, the user handset is capable of signalling the user as to which letter choice is being made. However, the method can operate even with no specialized handset equipment beyond a standard telephone. In this case, voice synthesis software, operating on a remote computer, can serve as the display means. Alternative choices of orderings are also appropriate when filling out computer based forms. Some fields in some forms may require input from different subsets of language, and thus different statistics, and thus different optimal orderings. For example, while entering a URL (Universal Resource Locator), one finds that the sequence "www" is very common, while in general language it is rather uncommon. Thus, an ordering conditional on a sequence of w's which causes w to be presented first in an order would be appropriate for a field in which a URL is to be entered, but would be potentially inappropriate for a field set to receive unrestricted English input.

In conclusion it is noted that numerous embodiments of the teachings of the present invention beyond those specifically described here are possible, and which do not extend beyond the scope of those teachings, which scope is defined by the appended claims. In particular, it is obvious even to one not very skilled in the art that these teachings are not limited to application to the standard ambiguous code, to the languages here chosen for illustration, or to applications to telephones. Essentially any electronic device could potentially benefit from text input means, and thus from the teachings of this invention. It is further obvious that the text-input methodology described here could be combined with well-known word-completion mechanisms to further reduce the number of keystrokes required for some varieties of text input.

PATENT LITERATURE REFERENCED

U.S. Pat. No. 5,818,437, Reduced keyboard disambiguating computer, Inventors: Grover; Dale L., King; Martin T., and Kushler; Clifford A. Oct 6, 1998

US provisional application number 60/111,665, Dec. 10, 1998, "Touch-typable devices based on ambiguous codes and methods to design such devices", Inventor: Howard Gutowitz.

What is claimed is:

1. An apparatus for inputting text using multi-tap, comprising
    a plurality of symbols;
    a plurality of key inputs, at least one of said plurality of key inputs associated with a portion of said plurality of symbols,
    a display, a database of psets, each of said psets having a permutation of some of said plurality of symbols, at least two of said psets having a permutation of said portion of said plurality of symbols associated with said at least one of said plurality of key inputs wherein said permutation of a first of said at least two psets is shift-inequivalent of said permutation of a second of said at least two psets, wherein when said at least one of said plurality of key inputs is activated, said portion of said plurality of symbols is displayed on said display according to said permutation of one of said at least two psets.

2. The apparatus of claim 1 wherein said at least one of said psets has a position-dependent permutation and wherein when said at least one of said plurality of inputs is activated, said portion of said plurality of symbols is displayed on said display according to said pset having said position-dependent permutation.

3. The apparatus of claim 2 wherein said position-dependent permutation is position-differential.

4. The apparatus of claim 1 wherein said at least one of said psets has a prefix-dependent permutation and wherein when said at least one of said plurality of inputs is activated, said portion of said plurality of symbols is displayed on said display according to said pset having said prefix-dependent permutation.

5. The apparatus of claim 4 wherein said psets having said prefix-dependent permutations have prefixes of variable length.

6. The apparatus of claim 1 said database of psets is coupled to said key inputs via a telecommunications link.

7. The apparatus of claim 1 further comprising at least one auxiliary input, wherein when said auxiliary input and said at least one of said plurality of key inputs are activated, said permutation of said at least one of said psets is changed.

8. The apparatus of claim 1 wherein said symbols displayed on said display are transmitted and stored.

9. The apparatus of claim 1 wherein said display is selected from the group consisting of a visual and auditory display.

10. The apparatus of claim 1 in which said psets have different permutations depending on whether said apparatus is used for text input or text retrieval.

11. The apparatus of claim 5 wherein said prefix-dependent permutation is hierarchical-differential.

12. A method for constructing a database of psets for use in a multi-tap input device, said device having a plurality of key inputs and a display, said device being used to input text formed from a plurality of symbols, the method comprising the steps of:

associating with at least one of said key inputs a portion of said plurality of symbols;

forming at least two psets having permutations of said portion of said plurality of symbols so that said permutation of a first of said at least two psets is shift-inequivalent of said permutation of a second of said at least two psets, displaying on said display said portion of said plurality of symbols according to said permutation of one of said at least two psets when said at least one of said plurality of key inputs is activated.

13. The apparatus of claim 1 further comprising predictive text input means selectively operable to interpret sequences of operations of input means as text.

14. The apparatus of claim 13 further comprising means to determine if said orderings or said predictive text input means should be used to determine the symbols displayed on said display means.

15. The apparatus of claim 1 wherein said database of psets comprises field-dependent psets for entering text into computerized forms having text entry fields.

16. The method of claim 12, wherein the step of forming at least two psets further includes the step of:

selecting said permutations of said at least two psets based on position information.

17. The method of claim 12, wherein the step of forming at least two psets further includes the step of:

selecting said permutations of said at least two psets based on prefix information.

18. A method of forming a database having N psets, each if said psets having a permutation formed from a portion of a plurality of symbols, the method comprising the steps of:

(a) forming a set of psets;

(b) including in said database a pset from said set of psets;

(c) selecting another pset from said set of psets;

(d) assigning a rating to said another pset based on psets included in said database of psets;

(e) repeating steps (c) and (d) until all psets in said set of psets have a rating (f) including in said database said one of said set of psets having the largest rating; and (g) repeating steps (c)–(f) until said database of psets has N psets.

19. The method of claim 18 wherein said step of forming a set of psets includes the step of:

forming said set of psets using position information.

20. The method of claim 19, further including the step of:

including in said database of psets only those psets of said set of psets having a low position.

21. The method of claim 18 wherein said step of forming a set of psets includes the step of:

forming said set of psets using prefix information.

22. The method of claim 21, further including the step of:

including in said database of psets only those psets of said set of psets having a small prefix.

23. The method of claim 18, wherein said database of N psets is used in a multi-tap input device and N is selected so as to minimize multi-taps.

24. The method of claim 18, wherein said database of N psets is used in a multi-tap input device having an amount of storage and N is selected so as to minimize said amount of storage.

* * * * *